US009515830B2

(12) United States Patent
Minematsu (10) Patent No.: US 9,515,830 B2
(45) Date of Patent: Dec. 6, 2016

(54) UNIVERSAL HASH FUNCTION COMPUTING DEVICE, METHOD AND PROGRAM

(71) Applicant: NEC CORPORATION, Tokyo (JP)

(72) Inventor: Kazuhiko Minematsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 15 days.

(21) Appl. No.: 14/415,465

(22) PCT Filed: Jun. 27, 2013

(86) PCT No.: PCT/JP2013/004021
§ 371 (c)(1),
(2) Date: Jan. 16, 2015

(87) PCT Pub. No.: WO2014/013680
PCT Pub. Date: Jan. 23, 2014

(65) Prior Publication Data
US 2015/0180666 A1    Jun. 25, 2015

(30) Foreign Application Priority Data
Jul. 18, 2012    (JP) .................................. 2012-159505

(51) Int. Cl.
*H04L 9/32* (2006.01)
*G09C 1/00* (2006.01)
*H04L 9/08* (2006.01)

(52) U.S. Cl.
CPC .............. *H04L 9/3223* (2013.01); *G09C 1/00* (2013.01); *H04L 9/0838* (2013.01); *H04L 9/3242* (2013.01); *H04L 2209/24* (2013.01)

(58) Field of Classification Search
CPC .................................................... H04L 9/3223
See application file for complete search history.

(56) References Cited

U.S. PATENT DOCUMENTS 2,354,951 A * 8/1944 Erisman .................... G07C 1/20
235/1 R
4,907,171 A * 3/1990 Nagashima ............... G06T 3/40
345/668
(Continued)

OTHER PUBLICATIONS

Taro L. Saito, "What will be changed by the introduction of SSDs?" Data Base System Basic Study, WEB+DB Press, Dec. 15, 2010, vol. 52, the first edition, pp. 89-108, 14 pages total.
(Continued)

*Primary Examiner* — Saleh Najjar
*Assistant Examiner* — Simon Kanaan
(74) *Attorney, Agent, or Firm* — Sughrue Mion, PLLC (57) ABSTRACT

A universal hash function calculation device includes a message register sequentially outputs a message of which the bit number is a prime number and of which the length is such that the smallest primitive root when the bit number is set as the modulo is 2, outputting said message one bit at a time. A cyclic key register cyclically permutates a key having the same number of bits as the message, and sequentially outputs a cyclic key vector obtained as a result of the cyclical permutation. On the basis of the sequentially-output cyclic key vector and a message bit that is sequentially output one bit at a time, a logical product calculation unit outputs the cyclic key vector when the message bit is 1, and outputs an all-zero vector having the same bit number as the cyclic key vector when the message bit is 0. A cumulative sum calculation unit accumulates calculation results having the same number as the output bit number and calculates the exclusive disjunction.

4 Claims, 8 Drawing Sheets

(56) References Cited

U.S. PATENT DOCUMENTS

| | | | |
|---|---|---|---|
| 6,182,216 B1* | 1/2001 | Luyster | H04L 9/002 380/28 |
| 7,046,802 B2 | 5/2006 | Rogaway | |
| 2009/0055458 A1* | 2/2009 | O'Neil | H04L 9/0618 708/400 |
| 2015/0227738 A1* | 8/2015 | Katoh | G09C 1/00 713/168 |

OTHER PUBLICATIONS

P.K.S. Wah and M. Z. Wang, "Realization and application of the Massey-Omura lock" Digital Comm., Int. Zurich Seminar, IEEE Press, 1984, pp. 175-182 (10 pages total).
K. Minematsu, T. Matsushima, Generalization and Extension of XEX* Mode, IEICE Trans. Fundamentals, Feb. 2009, vol. E92-A, No. 2, pp. 517-524.
D.E. Daykin, "On the Rank of the Matrix $f(A)$ and the Enumeration of Certain Matrices Over a Finite Filed", Journal London Math. Soc., 1960, pp. 36-42, vol. 35.
Morris Dworkin, "Recommendation for Block Cipher Modes of Operation: The XTS-AES Mode for Confidentiality on Storage Devices", National Institute of Standards and Technology (NIST),Special Publication 800-38E, U.S. Department of Commerce, Jan. 2010, pp. 1-4.
Hugo Krawczyk, "LFSR-based Hashing and Authentication", CRYPTO 1994, LNCS 839, Springer 1994, pp. 129-139.
Moses Liskov, et al., "Tweakable Block Ciphers", Advances in Cryptology—Crypto 2002, 22nd Annual International Cryptology Conference, Santa Barbara, California, USA, Aug. 18-22, 2002, Proceedings. Lecture Notes in Computer Science 2442 Springer 2002, pp. 31-46.
Roel Maes, et al., "Low-Overhead Inmplementation of a Soft Decision Helper Data Algorithm for SRAM PUFs", Cryptographic Hardware and Embedded Systems—CHES 2009, 11th International Workshop, Lausanne, Switzerland, Sep. 6-9, 2009, Proceedings. Lecture Notes in Computer Science 5747 Springer 2009, pp. 332-347.
Kazuhiko Minematsu, et al., "Provably Secure MACs From Differentially-Uniform Permutations and AES-based Implementations", FSE 2006, LNCS 4047, pp. 226-241.
Kazuhiko Minematsu, "Improved Security Analysis of XEX and LRW Modes", Selected Areas in Cryptography—SAC'06, LNCS 4356, pp. 96-113, Springer, 2007.
Phillip Rogaway, "Efficient Instantiations of Tweakable Blockciphers and Refinements to Modes OCB and PMAC", Advances in Cryptology—ASIACRYPT 2004, 10th International Conference on the Theory and Application of Cryptology and Information Security, Jeju Island, Korea, Dec. 5-9, 2004, Proceedings. Lecture Notes in Computer Science 3329 Springer 2004, pp. 16-31.
Phillip Rogaway, et al., "Online Ciphers from Tweakable Blockciphers", Topics in Cryptology—CT—RSA 2011—The Cryptographers' Track at the RSA Conference 2011, San Francisco, CA, USA, Feb. 14-18, 2011, Proceedings. Lecture Notes in Computer Science 6558 Springer 2011, pp. 237-249.
Palash Sarkar, "A New Multi-Linear Universal Hash Family", [online], Dec. 15, 2010, [searched on Jul. 19, 2013], Internet URL: http://eprint.iacr.org/2008/216 (21 pages total).
International Search Report of PCT/JP2013/004021, dated Jul. 30, 2013. [PCT/ISA/210].
Avrim Blum: "Universal and Perfect Hashing", Oct. 1, 2009, XP055242580, Pittsburgh.
Carter J L et al. "Universal Classes of Hash Functions", Journal of Computer and System Sciences, Academic Press, Inc., London, GB; vol. 18, Jan. 1, 1979, pp. 143-154, XP000652858; ISSN: 0022-0000, DOI: 10.1016/0022-0000 (79) 90044-8.
Communication dated Jan. 27, 2016, from the European Patent Office in counterpart European Application No. 13820116.5.
Minematsu Kazuhiko et al. "A Short Universal hash Function from Bit Rotation, and Applications to Blockcipher Modes" Oct. 23, 2013; vol. 8209; ISSN 0302-9743, ISBN 978-3-642-24711-8.

\* cited by examiner

UNIVERSAL HASH FUNCTION COMPUTING DEVICE, METHOD AND PROGRAM

CROSS REFERENCE TO RELATED APPLICATIONS

This application is a National Stage of International Application No. PCT/JP2013/004021 filed Jun. 27, 2013, claiming priority based on Japanese Patent Application No. 2012-159505, filed Jul. 18, 2012, the contents of all of which are incorporated herein by reference in their entirety.

TECHNICAL FIELD

The present invention relates to a universal hash function computing device, a universal hash function computing method, and a universal hash function computing program for computing a keyed universal hash function.

BACKGROUND ART

A universal hash function is a function for converting input of a predetermined input space into output of a fixed length. Unlike cryptographic hash functions such as SHA-1 (Secure Hash Algorithm 1) and MD5 (Message Digest 5), a random key is also used as an input. A universal hash function H using an input x and a key k is formally expressed by Expression 1 shown below.

$$y = H(k, x) \quad \text{(Expression 1)}$$

Where a key space is D_key, a set of functions {H(k,*): k in D_key} is sometimes called a family of universal hash functions.

The concept of universal hash functions was initially proposed by Carter and Wegman and since then have been used as an elemental technique in various fields of cryptographic technology. Typical examples thereof include a system such as HMAC (Keyed-Hashing for Message Authentication Code) using a cryptographic hash function in the field of Message Authentication Code (MAC) as well as a method that combines a universal hash function and a block cipher or a stream cipher. This method is called Carter-Wegman MAC (CW-MAC). In some constructions of universal hash functions, Carter-Wegman MAC is known to be capable of significantly fast computation.

There are some variations of properties required for universal hash functions. A typical property is a property called e-almost universal. When the relation of Expression 2 shown below is satisfied for an input space D_in, an output space D_out, and a key space D_key, the function H: D_key×D_in->D_out is said to be an (e-AU) hash function that satisfies the property of e-almost universal.

$$Pr\_K[H(K,x)=H(K,x')] \leq e, \text{ for all } x \neq x', x,x' \text{ in } D\_in \quad \text{(Expression 2)}$$

That is, Expression 2 shown above indicates the probability that the outputs of H agree for two different inputs is merely e when the key is a uniform random number over D_key. When a keyed function H satisfies Expression 2 shown above, H is said to be an e-AU hash function.

When D_out is an n-bit space and satisfies the relation of Expression 3 shown below, H is said to be an (e-AXU) hash function that satisfies the property of e-almost XOR universal.

$$Pr\_K[H(K,x) \text{ xor } H(K,x')=d] \leq e, \text{ for all } x \neq x', x,x' \text{ in } D\_in, \text{ for all } d \text{ in } D\_out \quad \text{(Expression 3)}$$

In Expression 3 shown above, x xor y denotes the exclusive OR (XOR) of x and y for each bit. When input and output spaces are the same, e-AXU is a stronger condition than e-AU. When a keyed function H satisfies Expression 3 shown above in the same manner as the e-AU hash function, H is said to be an e-AXU hash function.

Here, an e-AU hash function with two block inputs and one block output or an e-AXU function with one block input/output will be mainly described as the most basic form of universal hash functions. The block length is n bits, unless otherwise specified. If H(k,x) is an e-AXU hash function with one block input/output, a function G with two block inputs and one block output shown by Expression 4 below is always an e-AU hash function.

$$G(k,(x[1],x[2]))=H(k,x[1]) \text{ xor } x[2] \quad \text{(Expression 4)}$$

It is known that data of arbitrary length can be processed by processing data like a binary tree using the e-AU hash function with two block inputs and one block output (see, for example, NPL 1). Therefore, if the e-AXU hash function with one block input/output is designed, universal hash functions of every length can be generated in principle.

There are many researches for specific methods for creating e-AU or e-AXU universal hash functions. One of the most popular methods is a method using a finite field GF(2n). This method defines a function H by Expression 5 shown below, for example, when the input space is GF(2n) and the output space is GF(2n).

$$H(K,x[1])=x[1] \text{mult } K \quad \text{(Expression 5)}$$

In Expression 5, K denotes a uniform random number over GF(2n), and mult denotes multiplication over GF(2n). GF(2n) has 2n elements and thus can be uniquely expressed by an n-bit sequence. Therefore, H in Expression 5 shown above is a keyed function with n-bit input/output and is known to be (1/2n)-AXU. This value is the theoretical minimum value in the case of an n-bit output. For the same reason as the reason shown for Expression 4, it is understood that H in Expression 6 shown below is a keyed function with a 2n-bit input and an n-bit output, and is (1/2n)-AU.

$$H(K,(x[1],x[2]))=x[1] \text{mult } K+x[2] \quad \text{(Expression 6)}$$

In Expression 6 shown above, +denotes addition (that is, xor) over GF(2n). Except for this, the expression is the same as Expression 5.

NPL 2 describes a method using a Toeplitz matrix proposed by Krawczyk. When the i-th row j-th column component in a binary Toeplitz matrix of n rows and m columns is written as c(i,j) in {0,1}, c(i,j) satisfies the relation of Expression 7 shown below.

$$c(i,j)=c(i+1,j+1) \text{ for any } 1 \leq i \leq n-1, \text{ any } 1 \leq j \leq m-1 \quad \text{(Expression 7)}$$

That is, all the components on a diagonal are the same, and the matrix can be uniquely determined by designating n+m−1 components included in the first column and the first row. According to NPL 2, in a binary Toeplitz matrix M of n rows and m columns, when the n+m−1 independent components are given at random each from the range {0,1}, the (1/2n)-AXU hash function can be constructed using an m-bit input and an n-bit output by a matrix product. That is, this function is defined by Expression 8 shown below.

$$\text{ToplitzHash}(K,x)=M \cdot x \quad \text{(Expression 8)}$$

In Expression 8, x denotes m bits, K denotes a (n+m−1)-bit key, and M denotes a random, binary Toeplitz matrix of n rows and m columns in which the first column and the first row are set using K. M·x denotes a matrix-vector product, and the result is n bits. The bitwise computation is performed as a Boolean variable. Specifically, when a binary square Toeplitz matrix of n rows and n columns is used, the key is 2n−1 bits.

NPL 2 further describes a method in which, considering the case where m is far greater than n, the first column and the first row are set as an output sequence of a Linear Feedback Shift Register (LFSR) the initial value of which is set at random. By using this method, the length of the key can be set as a constant that is not directly relevant to the size of the matrix.

There are some applied methods of the e-AXU hash function with n-bit input/output. This hash function is applied in encryption and authentication in combination with block ciphers. For example, an extended block cipher called Tweakable block cipher proposed by Liskov et al. is known.

The Tweakable block cipher has an external parameter called Tweak in addition to a key and a message (that is, a plaintext and a ciphertext). It is known that the Tweakable block cipher in which a message and a Tweak are both n bits can be created with a general n-bit block cipher E such as AES (Advanced Encryption Standard) and an e-AXU hash function H with n-bit input/output (see, for example, NPL 3, NPL 4, and NPL 5).

Figure 6:
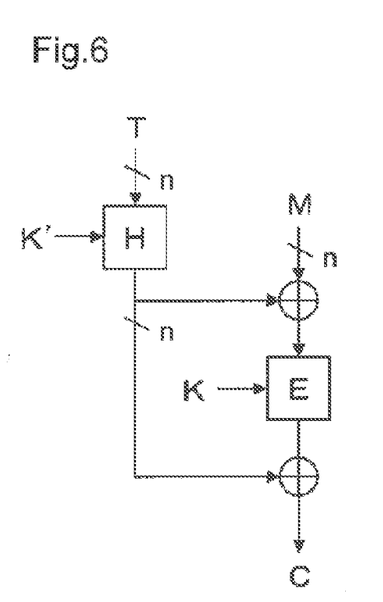
FIG. 6 is an illustration showing an example of a method of constructing a Tweakable block cipher with an n-bit block and an n-bit Tweak.

FIG. 6 is an illustration showing an example of the method of constructing a Tweakable block cipher with an n-bit block and an n-bit Tweak, from an n-bit block cipher E and an n-bit input/output e-AXU hash function H. Specifically, the Tweakable block cipher above can generally be constructed by using the result of applying the Tweak to H as a mask above and below E, as shown in FIG. 6.

The Tweakable block cipher in which a message and a Tweak are both n bits is used, for example, in authentication encryption systems (see PTL 1 and NPL 6), encryption systems for storage (see NPL 7), and online encryption (see NPL 8).

The e-AXU hash function with n-bit input/output can also be used for generating individual IDs using individual variability in physical properties of hardware. For example, NPL 9 states that an e-AXU hash function with 128-bit input/output is constructed with a Toeplitz matrix. NPL 9 also states that the e-AXU hash function has a 64-bit input and a 128-bit output and the matrix is a Toeplitz matrix of order 128.

NPL 10 describes a lemma as to the rank of a matrix with elements in a finite field. NPL 11 describes the conditions of irreducibility of all-one-polynomial.

CITATION LIST

Patent Documents

PTL 1
U.S. Pat. No. 7,046,802

Non Patent Literatures

NPL 1: K. Minematsu, Y. Tsunoo, Provably Secure MACs from Differentially-Uniform Permutations and AES-Based Implementations. FSE 2006, LNCS 4047, pp. 226-241.
NPL 2: H. Krawczyk, LFSR-based Hashing and Authentication. CRYPTO 1994, LNCS 839, Springer 1994, pp. 129-139
NPL 3: M. Liskov, R. L. Rivest, D. Wagner: Tweakable Block Ciphers, Advances in Cryptology—CRYPTO 2002, 22nd Annual International Cryptology Conference, Santa Barbara, Calif., USA, Aug. 18-22, 2002, Proceedings. Lecture Notes in Computer Science 2442 Springer 2002, pp. 31-46.
NPL 4: K. Minematsu, Improved Security Analysis of XEX and LRW Modes, Selected Areas in Cryptography—SAC'06, LNCS 4356, pp. 96-113, Springer, 2007.
NPL 5: K. Minematsu, T. Matsushima, Generalization and Extension of XEX* Mode, IEICE Transactions 92-A(2): 517-524 (2009).
NPL 6: Phillip Rogaway: Efficient Instantiations of Tweakable Blockciphers and Refinements to Modes OCB and PMAC. Advances in Cryptology—ASIACRYPT 2004, 10th International Conference on the Theory and Application of Cryptology and Information Security, Jeju Island, Korea, Dec. 5-9, 2004, Proceedings. Lecture Notes in Computer Science 3329 Springer 2004, pp. 16-31
NPL 7: NIST Special Publication 800-38E, Recommendation for Block Cipher Modes of Operation: The XTS-AES Mode for Confidentiality on Storage Devices, January 2010.
NPL 8: P. Rogaway, H. Zhang, Online Ciphers from Tweakable Blockciphers, Topics in Cryptology—CT-RSA 2011—The Cryptographers' Track at the RSA Conference 2011, San Francisco, Calif., USA, Feb. 14-18, 2011, Proceedings. Lecture Notes in Computer Science 6558 Springer 2011, pp. 237-249.
NPL 9: R. Maes, P. Tuyls, I. Verbauwhede, Low-Overhead Implementation of a Soft Decision Helper Data Algorithm for SRAM PUFs, Cryptographic Hardware and Embedded Systems—CHES 2009, 11th International Workshop, Lausanne, Switzerland, Sep. 6-9, 2009, Proceedings. Lecture Notes in Computer Science 5747 Springer 2009, pp. 332-347
NPL 10: D. E. Daykin "On the Rank of the Matrix f(A) and the Enumeration of Certain Matrices over a Finite Field" Journal London Math. Society, Vol. 35, pp. 36-42, 1960.
NPL 11: P. K. S. Wah and M. Z. Wang, "Realization and application of the Massey-Omura lock" Digital Comm., Int. Zurich Seminar, IEEE Press, 1984, pp. 175-182.

SUMMARY OF INVENTION

Technical Problem

The computation of a universal hash function shown in Expressions 5 and 6 above require multiplication over GF(2n). For example, in a case where a universal hash function is used for the cipher-related application, if it is intended to create an e-AXU or e-AU hash function with sufficiently small e, the value of n is a large number, for example, such as 64, 128, 256, or 512. The calculation costs in this case are, in general, considerably high.

In the case of using a system that combines a Toeplitz matrix and an LFSR, the bias e as AXU decreases. For example, when the length of the LFSR is n bits, the system that combines a Toeplitz matrix and an LFSR is (n/2n)-AXU. In order to achieve the bias above, it is necessary not only to give the initial value of the n-bit register of the LFSR at random but also to determine the irreducible feedback polynomial of the LFSR at random. Therefore, an n-bit key is required when the initial value of the n-bit register of the LFSR is given at random. A 2n-bit key is required when the irreducible feedback polynomial of the LFSR is determined at random.

In other words, in the system using a Toeplitz matrix, when it is intended to bring the bias e in e-AXU closer to 1/2n, the key length is almost 2n bits, whether the LFSR is used or not. The key length of 2n bits unit that the costs for creating a key is increased compared with when the key length is n bits.

Figure 7:
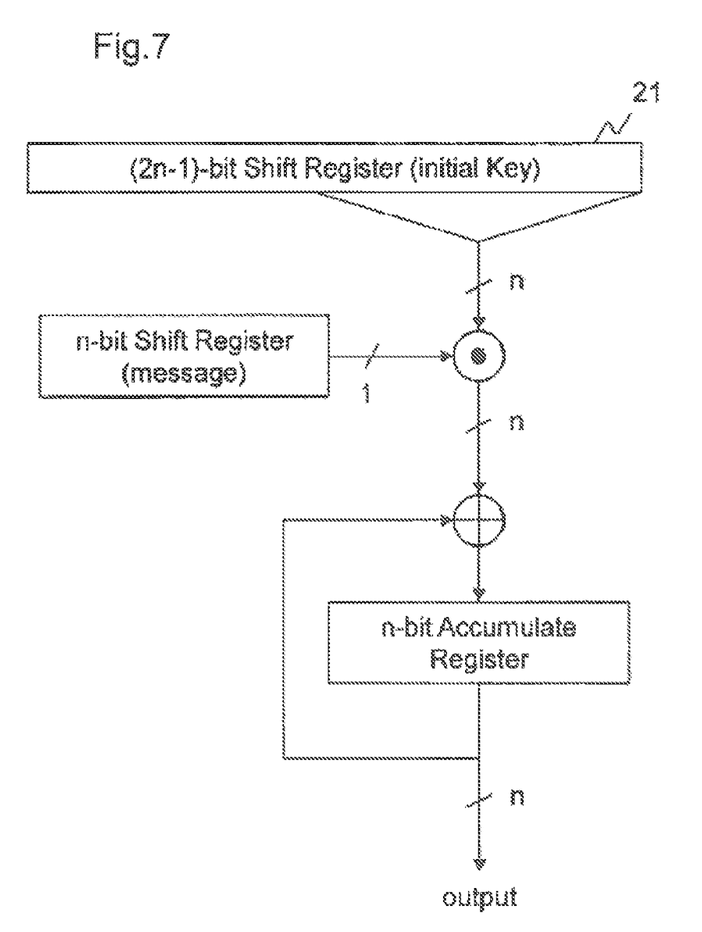
FIG. 7 is an illustration showing an example of a hardware implementation of the n-bit input/output e-AXU hash function described in NPL 2 without using an LFSR.
Figure 8:
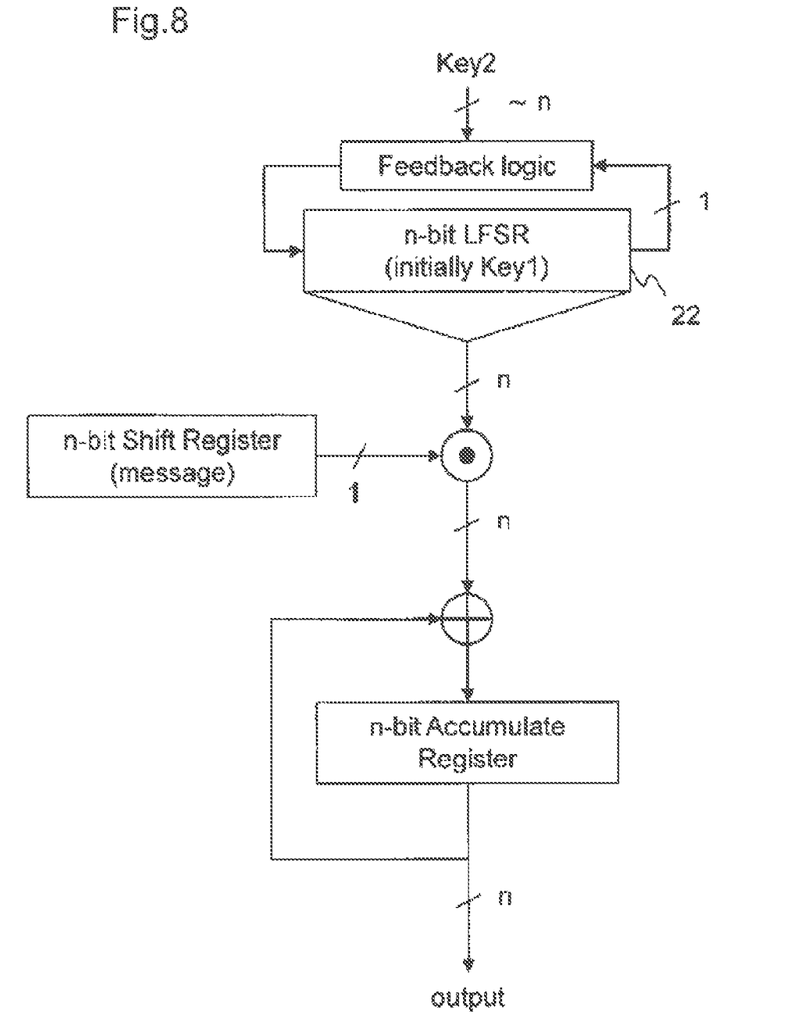
FIG. 8 is an illustration showing an example of a hardware implementation of the n-bit input/output e-AXU hash function described in NPL 2 using an LFSR.

FIG. 7 is an illustration showing an example of a hardware implementation of the n-bit input/output e-AXU hash function described in NPL 2 without using an LFSR. FIG. 8 is an illustration showing an example of a hardware implementation of the n-bit input/output e-AXU hash function described in NPL 2 using an LFSR. The implementation illustrated in FIG. 8 differs from the implementation illustrated in FIG. 7 in that an LFSR (the n-bit LFSR in FIG. 8) is used in implementation.

Implementing the system using a Toeplitz matrix in hardware requires increasing the number of registers, thereby complicating the circuitry and enlarging the scale of the circuitry.

Even considering the points described above, the universal hash function using a Toeplitz matrix is, in general, a suitable system for hardware implementation. In particular, the system that combines a Toeplitz matrix and an LFSR can be implemented in hardware very easily when the key is fixed. However, when the key cannot be fixed, the system that combines a Toeplitz matrix and an LFSR requires implementation adapted to the feedback polynomial changing depending on the key, thereby further complicating implementation in hardware.

The present invention therefore aims to provide a universal hash function computing device capable of bringing the bias closer to the theoretical minimum value (1/2n) even with a key length of n bits when an e-AXU hash function system with n-bit input/output is used.

Solution to Problem

A universal hash function computing device according to the present invention includes:

a message register that stores a message having a length such that the number of bits is a prime number and the least primitive root modulo the number of bits is 2, and outputs the message sequentially bit by bit;

a cyclic key register that stores a key having the number of bits equal to the number of bits of the message, cyclically permutates the key sequentially bit by bit in a fixed direction, either leftward or rightward, and sequentially outputs a cyclic key vector obtained as a result of cyclic permutation;

AND operation unit, based on the cyclic key vector sequentially output from the cyclic key register and a message bit output sequentially bit by bit from the message register, that outputs the cyclic key vector if the message bit is 1 and outputs an all-zero vector having the same number of bits as the cyclic key vector if the message bit is 0; and cumulative sum operation unit that accumulates operation results as many as the number of bits output by the AND operation unit to calculate an exclusive OR and outputs a calculation result of the exclusive OR when operation results as many as the number of bits are accumulated.

A universal hash function computing method according to the present invention includes:

from a message register that stores a message having a length such that the number of bits is a prime number and the least primitive root modulo the number of bits is 2, outputting the message sequentially bit by bit;

from a cyclic key register that stores a key having the number of bits equal to the number of bits of the message, cyclically permutating the key sequentially bit by bit in a fixed direction, either leftward or rightward, and sequentially outputting a cyclic key vector obtained as a result of cyclic permutation;

based on the cyclic key vector sequentially output from the cyclic key register and a message bit sequentially output bit by bit from the message register, outputting the cyclic key vector if the message bit is 1 and outputting an all-zero vector having the same number of bits as the cyclic key vector if the message bit is 0; and accumulating operation results as many as the number of bits output to calculate an exclusive OR and outputting a calculation result of the exclusive OR when operation results as many as the number of bits are accumulated.

A computer readable medium storing a program which causes a computer to execute universal hash function, comprising:

a message output process of, from a message register that stores a message having a length such that the number of bits is a prime number and the least primitive root modulo the number of bits is 2, outputting the message sequentially bit by bit;

from a cyclic key register that stores a key having the number of bits equal to the number of bits of the message, cyclically permutating the key sequentially bit by bit in a fixed direction, either leftward or rightward, and sequentially outputting a cyclic key vector obtained as a result of cyclic permutation;

based on the cyclic key vector sequentially output from the cyclic key register and a message bit sequentially output bit by bit from the message register, outputting the cyclic key vector if the message bit is 1 and outputting an all-zero vector having the same number of bits as the cyclic key vector if the message bit is 0; and accumulating operation results as many as the number of bits output to calculate an exclusive OR and outputting a calculation result of the exclusive OR when operation results as many as the number of bits are accumulated.

Advantageous Effects of Invention

The present invention can bring the bias closer to the theoretical minimum value (1/2n) even with a key length of n bits when an e-AXU hash function system with n-bit input/output is used.

DESCRIPTION OF EMBODIMENTS

Exemplary embodiments of the present invention will be described below with reference to the drawings. In the following, + denotes a bitwise exclusive OR, unless otherwise specified. It is also assumed that the length of one block is n bits. The i-bit left cyclic shift of a vector x is denoted as rot(i,x).

Figure 1:
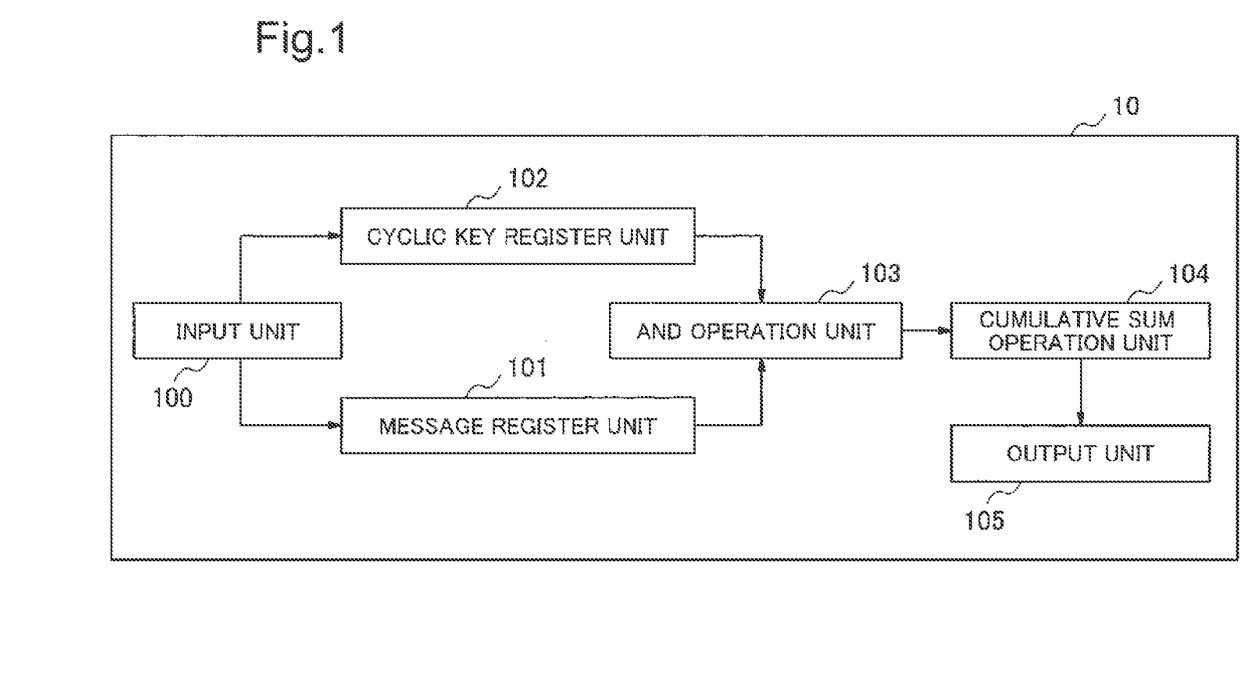
FIG. 1 is a block diagram showing an exemplary embodiment of a universal hash function computing device according to the present invention.

FIG. 1 is a block diagram showing an exemplary embodiment of a universal hash function computing device according to the present invention. The universal hash function computing device 10 in the present embodiment includes input unit 100, message register unit 101, cyclic key register unit 102, AND operation unit 103, cumulative sum operation unit 104, and output unit 105.

The universal hash function computing device 10 is implemented, for example, by a CPU, a memory, and a magnetic disk. Each unit in the universal hash function computing device is implemented, for example, by running a program stored in the magnetic disk on the CPU.

Specifically, the message register unit 101, the cyclic key register unit 102, the AND operation unit 103, and the cumulative sum operation unit 104 are implemented by the CPU of a computer that operates in accordance with a program (universal hash function computing program).

The input unit 100 inputs a target n-bit message M=(M[1], . . . ,M[n]) and an n-bit key K=(K[1], . . . ,K[n]). The input unit 100 is implemented, for example, by a character input device such as a keyboard. The input unit 100 may be implemented, for example, by an interface that receives a message input from another device. In the following description, bitwise information M[i] included in the message M may also be denoted as a message bit.

Here, n (that is, the number of bits) is a prime number, and the primitive root modulo n satisfies 2. Therefore, the number of bits of the message M is a prime number, and the least primitive root modulo the number of bits is 2. The number of bits of the key K is equal to the number of bits (specifically, n) of the message M.

The input unit 100 allows the input message M to be stored in the message register unit 101. The input unit 100 also allows the input key K to be stored in the cyclic key register unit 102.

The message register unit 101 stores the input message and outputs the stored message sequentially bit by bit in response to an external clock. Specifically, given that the clock moves from 1 to n, the message register unit 101 outputs M[i] when the clock is i.

The cyclic key register unit 102 holds the input key K and outputs the value obtained by cyclically shifting it in response to an external clock. Specifically, given that the clock moves from 1 to n, the cyclic key register unit 102 outputs rot(i-1,K) when the clock is i.

In the present embodiment, the key is cyclically permutated leftward sequentially bit by bit, by way of example. However, the direction of cyclic permutation is not limited to leftward and may be rightward. That is, the cyclic key register unit 102 sequentially performs cyclic permutation bit by bit in a fixed direction, either leftward or rightward, in response to a clock and sequentially outputs an n-bit cyclic key vector obtained as a result of cyclic permutation in response to a clock.

The AND operation unit 103 calculates the AND of the vector and the bit from M[i] output by the message register unit 101 and rot(i-1,K) output by the cyclic key register unit 102 and outputs the calculation result. That is, if we let S(i) be the result output by the AND operation unit 103 when the clock is i, S(i) is rot(i-1,K) if M[i] is 1, and S(i) is an n-bit all-zero value if M[i] is 0.

In other words, the AND operation unit 103 outputs a cyclic key vector rot(i-1,K) if the message bit M[i] is 1, and outputs an all-zero vector having the same number of bits (n bits) as the cyclic key vector if the message bit M[i] is 0.

The cumulative sum operation unit 104 outputs the exclusive OR of all of the outputs from the AND operation unit 103 in a period during which the clock moves from 1 to n. Specifically, the cumulative sum operation unit 104 outputs S(1)+S(2)+ . . . +S(n).

That is, the cumulative sum operation unit 104 accumulates the operation results as many as the number of bits output by the AND operation unit 103 (for example, the operation result in response to the first clock through the operation result in response to the n-th clock) and calculates the exclusive OR (for example, XOR). The cumulative sum operation unit 104 then outputs the calculation result of the exclusive OR when the operation results as many as the number of bits above are accumulated (for example, in response to the n-th clock). The cumulative sum operation unit 104 may hold all of S(i) and calculate the exclusive OR or may sequentially calculate the exclusive OR without holding all of S(i).

The output unit 105 outputs the output result from the cumulative sum operation unit 104 (that is, S(1)+S(2)+ . . . +S(n)) to, for example, a computer display or a printer.

Figure 2:
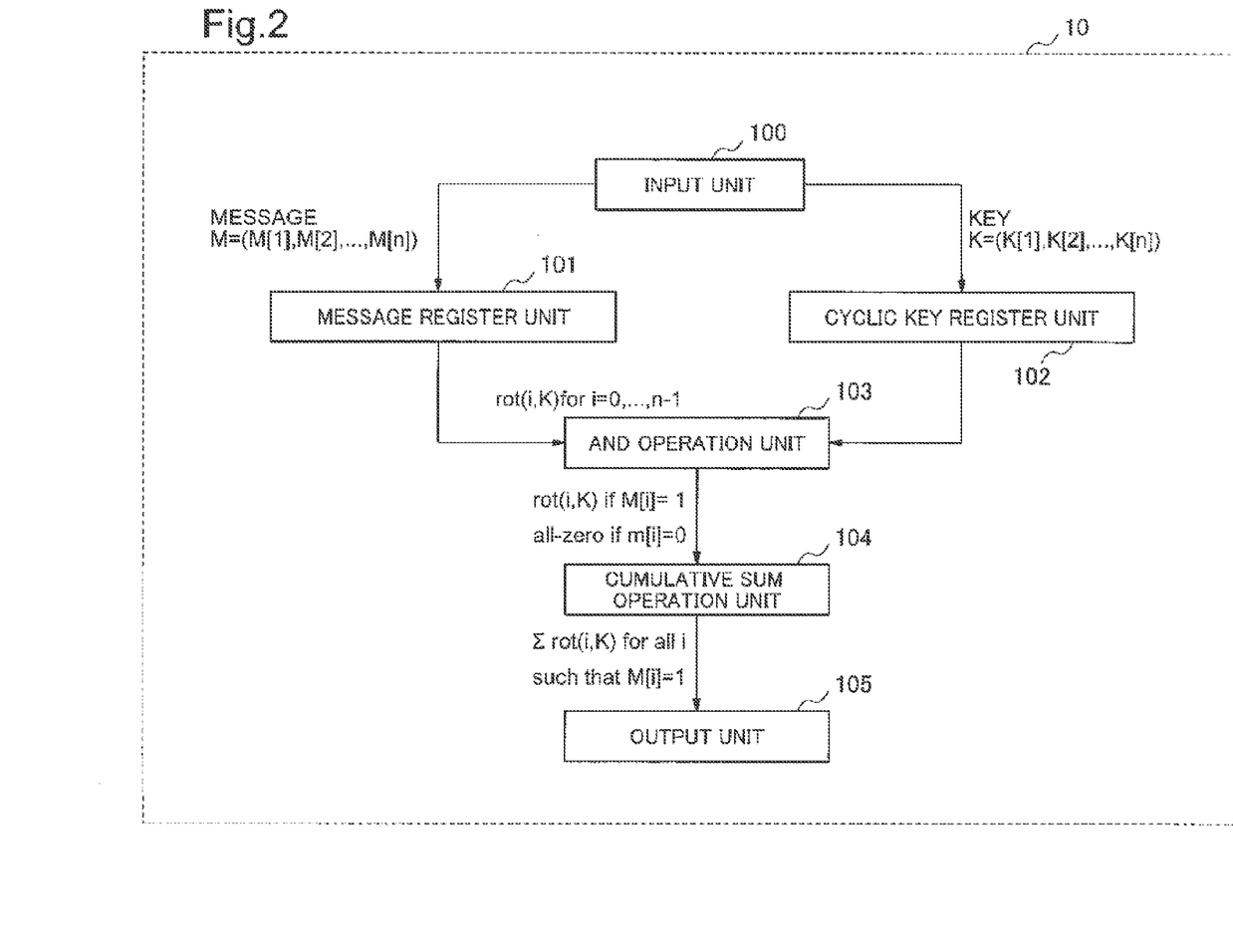
FIG. 2 is an illustration showing an operation example of the universal hash function computing device in the present embodiment.
Figure 3:
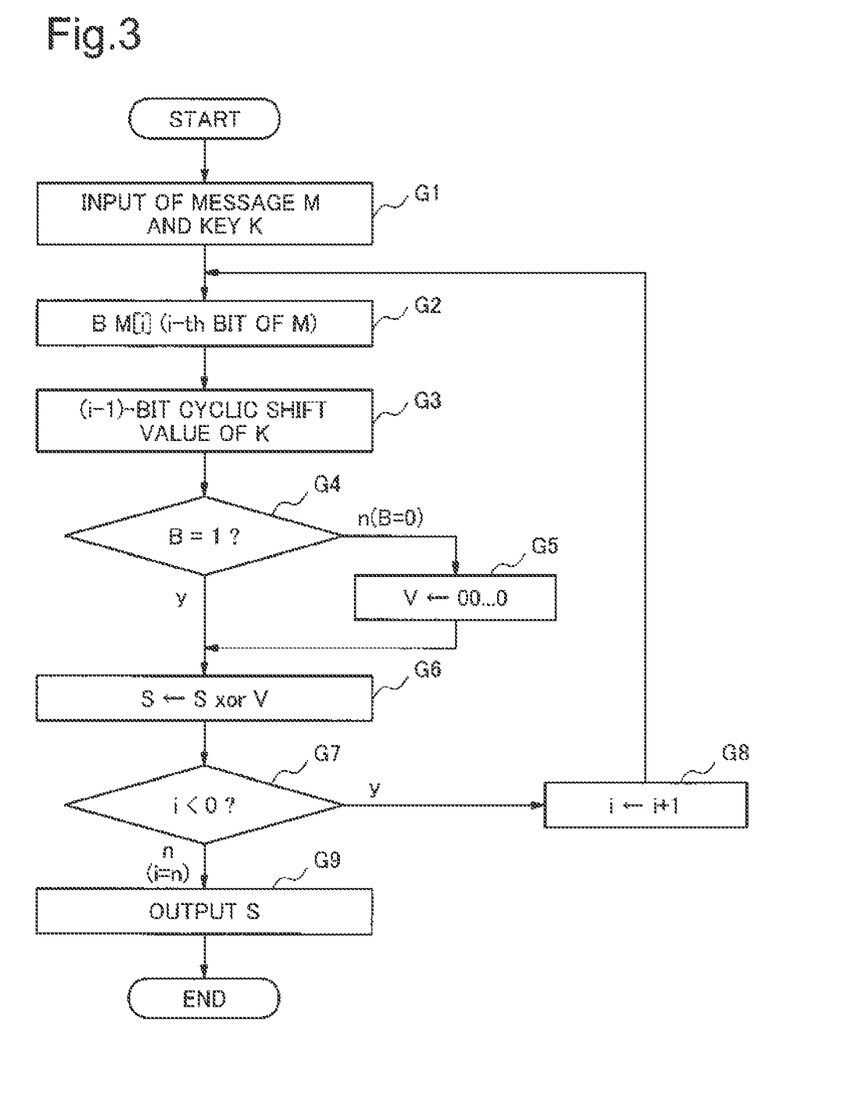
FIG. 3 is a flowchart showing an operation example of the universal hash function computing device in the present embodiment.

The operation of the universal hash function computing device in the present embodiment will be described with reference to FIG. 2 and FIG. 3. FIG. 2 is an illustration showing an operation example of the universal hash function computing device in the present embodiment. FIG. 3 is a flowchart showing an operation example of the universal hash function computing device in the present embodiment.

First, the input unit 100 inputs a target n-bit message M=(M[1], M[2], . . . , M[n]) and an n-bit key K (step G1 in FIG. 3). As shown in FIG. 2, the input message M is input to the message register unit 101 and the key K is input to the cyclic key register unit 102.

Next, the message register unit 101 outputs a message bit M[i] (where i is a clock) in accordance with the clock moving from 1 to n (step G2). Specifically, as shown in FIG. 2, the message register unit 101 sequentially outputs each bit M[i] of the n-bit message (M[1], M[2], . . . , M[n]) for i=1 to n. In the following description, this output is denoted as B.

Next, the cyclic key register unit 102 outputs rot(i-1,K) that is the (i-1)-bit cyclic shift (where i is a clock) of the key K in accordance with the clock moving from 1 to n (step G3). Specifically, the cyclic key register unit 102 sequentially outputs rot(1,K) that is a result of i-bit cyclic shift of the n-bit key K for i=1 to n, as shown in FIG. 2. In the following description, this output is denoted as V.

Next, the AND operation unit 103 determines whether B is 1 (step G4). If B is 1 (y in step G4), the AND operation unit 103 outputs V as it is. If B is not 1, that is, if B is 0 (n in step G4), the AND operation unit 103 turns V into an all-zero value and outputs the same (step G5).

Specifically, as shown in FIG. 2, the AND operation unit 103 outputs rot(i,K) if M[i]=1 and outputs an all-zero vector if M[i]=0, for i=1 to n.

The cumulative sum operation unit 104 calculates the sum of the immediately preceding cumulative sum S and V and updates S (step G6). The initial value of S is set in advance in step G1 such that all the bits are set to zero. Specifically, as shown in FIG. 2, the cumulative sum operation unit 104 adds the vector input from the AND operation unit 103 (that is, calculates the exclusive OR) for i=1 to n and outputs the result.

The cumulative sum operation unit 104 thereafter determines whether the clock i reaches n (step G7). If the clock i does not reach n (y in step G7), 1 is added to i (step G8), and the processing after step G2 is performed again. If the clock i does not reach n, that is, if i=n (n in step G7), the cumulative sum operation unit 104 outputs the cumulative sum S (step G9).

That is, the cumulative sum operation unit 104 continues the processing of updating S until the clock i reaches n, and, if i reaches n, outputs the cumulative sum S.

As described above, according to the present embodiment, the message register unit 101 outputs a message M of n bits sequentially bit by bit. Note that the following conditions should be met: the number of bits n is a prime number and the least primitive root modulo n is 2. The cyclic key register unit 102 cyclically permutates the key K sequentially bit by bit in a fixed direction, either leftward or rightward, and sequentially outputs the cyclic key vector obtained as a result of cyclic permutation. The AND operation unit 103 outputs a cyclic key vector if M[i] is 1, and outputs an all-zero vector having the same number of bits as the cyclic key vector if M[i] is 0, based on the cyclic key vector and the message bit M[i]. The cumulative sum operation unit 104 accumulates n operation results to calculate the exclusive OR and, when n operation results are accumulated, outputs the calculation result of the exclusive OR.

Thus, the bias can be brought closer to the theoretical minimum value (1/2n) even with a key length of n bits when the e-AXU hash function system with n-bit input/output is used.

According to the present embodiment, when the e-AXU hash function is computed with the bias e sufficiently close to 1/2n that is the theoretical minimum value, where both the input length and the output length are n bits, simple computation is possible and the key length can be shortened, compared with the Toeplitz matrix-based systems. The reason for this is described below.

First, we define the i-bit cyclic shift of a vector x as rot(i,x). Although the effects of the present invention are the same whether the direction of the cyclic shift is leftward or rightward, the description here is given assuming that the direction is uniformly leftward. If x is an n-bit value $(x[1],x[2], \ldots ,x[n])$, then $rot(i,x)=(x[i],x[i+1], \ldots ,x[n],x[1], \ldots ,x[i-1])$. Furthermore, $rot(0,x)=rot(n,x)=x$. If we let the n-bit input in the method according to the present invention be $x=(x[1],x[2], \ldots ,x[n])$ and the n-bit key be K, then the output can be expressed by Expression 9 shown below.

$$y=\mathrm{XOR}\_\{i:x[i]=1\}\ rot(i-1,K) \qquad \text{(Expression 9)}$$

XOR_{i:x[i]=1} in Expression 9 above means that XOR operation is performed for all i that satisfies x[i]=1. Here, y is equal to a matrix-vector product of a matrix M, where rot(i-1,K) is the i-th column (i=1, . . . ,n), and an input column vector xT. Here, M is a cyclic matrix of order n where rot(0,K)=K is the first column. Here, it is understood that the keyed function expressed by Expression 9 above is an n-bit input/output (2/2n)-AXU hash function when n is a prime number and the least primitive root modulo n is 2.

This is derived by combining the lemma as to the rank of a matrix with elements in a finite field described in NPL 10 with the conditions of irreducibility of all-one-polynomial described in NPL 11. Here, since the theoretical minimum value of the bias e is (1/2n), this function can be said to almost achieve the theoretically optimum bias.

Figure 4:
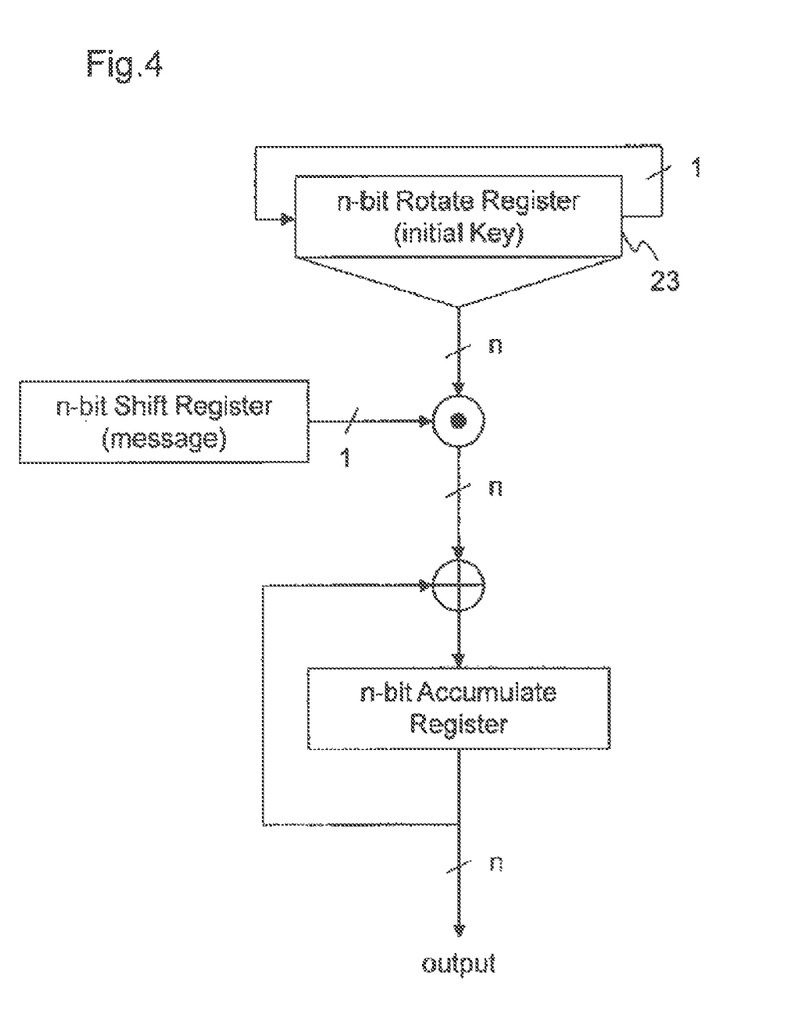
FIG. 4 is an illustration showing an example of a method of implementing a universal hash function in hardware.

The method of implementing the universal hash function described above in hardware will be described. FIG. 4 is an illustration showing an example of a method of implementing a universal hash function in hardware.

For example, in a case where the n-bit input/output e-AXU hash function using a Toeplitz matrix is implemented in hardware without using an LFSR, as shown in FIG. 7, a (2n-1)-bit shift register 21 is used with a (2n-1)-bit initial value as a key, and the process of taking out n bits at a fixed position is required for each clock. Here, the bias e is the theoretical minimum value of 1/2n.

On the other hand, in a case where the n-bit input/output e-AXU hash function using a Toeplitz matrix is implemented in hardware using an LFSR, as shown in FIG. 8, an n-bit LFSR 22 is used with an n-bit initial value as a key, and the process of taking out the entire register (n-bit) can be performed for each clock. In this case, however, another key of about n bits is necessary to determine a feedback polynomial for the LFSR at random. A register of about n bits is thus required in order to hold information of this key. Moreover, since the feedback polynomial is key-dependent, the hardware implementation is more complicated. In this case, the bias e is known to be n/2n slightly larger than the theoretical minimum value.

However, as shown in FIG. 4, the universal hash function computation according to the present embodiment can be implemented by the process of taking out the entire register (n-bit) for each clock, using the n-bit rotate register 23 with an n-bit initial value as a key. The computation method in the present embodiment therefore can shorten the register and also simplify the implementation method, compared with the implementation methods shown in FIG. 7 and FIG. 8.

In the system using a Toeplitz matrix, n can be any positive integer, whereas the universal hash function computing method according to the present invention requires the conditions that n is a prime number and the least primitive root modulo n is 2. However, in practice, it does not matter so much because there are many such prime numbers and they are distributed uniformly to some extent. For example, to achieve the bias e on the order of 1/264, n=61 or n=67 may be selected as n that satisfies the conditions. To achieve the bias e on the order of 1/2128, n=107 or n=131 may be selected as n that satisfies the conditions.

As described above, the e-AXU hash function with n-bit input/output can be applied to various types of encryption and authentication, for example, in combination with an n-bit block cipher.

Figure 5:
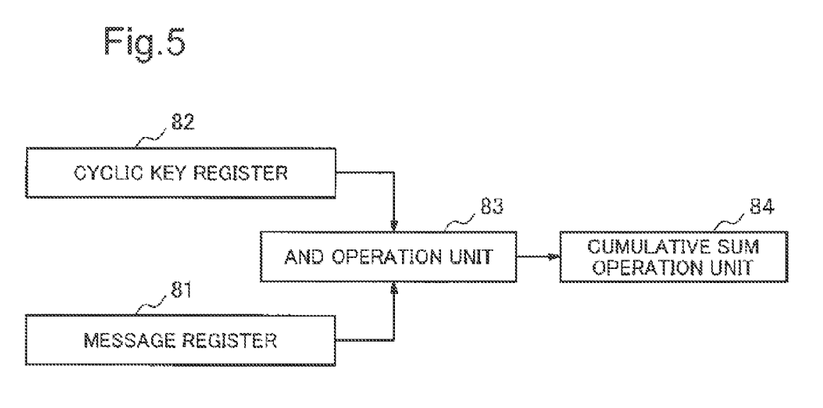
FIG. 5 is a block diagram showing the overview of the universal hash function computing device according to the present invention.

The overview of the present invention will be described. FIG. 5 is a block diagram showing the overview of the universal hash function computing device according to the present invention. The universal hash function computing device according to the present invention includes: a message register 81 (for example, message register unit 101) for storing a message (for example, M=(M[1], M[2], . . . , M[n])) having a length such that the number of bits (for example, n) is a prime number and the least primitive root modulo the number of bits is 2 (that is, n that satisfies that the least primitive root modulo n is 2), and outputting the message sequentially (for example, in response to a clock) bit by bit; a cyclic key register 82 (for example, cyclic key register unit 102) for storing a key (for example, K=(K[1], . . . ,K[n])) having the number of bits (for example, n) equal to the number of bits of the message, cyclically permutating the key sequentially (for example, in response to a clock) bit by bit in a fixed direction, either leftward or rightward, and sequentially (for example, in response to a clock) outputting a cyclic key vector (for example, of n bits) obtained as a result of cyclic permutation; AND operation unit 83 (for example, AND operation unit 103) for, based on the cyclic key vector sequentially output from the cyclic key register 82 and a message bit (for example, M[i]) output sequentially bit by bit from the message register 81, outputting the cyclic key vector if the message bit is 1 and outputting an all-zero vector having the same number of bits as the cyclic key vector if the message bit is 0; and cumulative sum operation unit 84 (for example, cumulative sum operation unit 104) for accumulating operation results as many as the number of bits output by the AND operation unit 83 (for example, accumulates the operation result in response to the first clock through the operation result in response to the n-th clock) to calculate the exclusive OR (for example, XOR), and outputting the calculation result of exclusive OR when operation results as many as the number of bits are accumulated (for example, in response to the n-th clock).

Such a construction can bring the bias closer to the theoretical minimum value (1/2n) even with a key length of n bits when the e-AXU hash function system with n-bit input/output is used.

The message register 81 may output the message sequentially bit by bit in response to a clock. The cyclic key register 82 may cyclically permutate the key sequentially bit by bit in response to a clock and may sequentially output a cyclic key vector obtained as a result of cyclic permutation in response to a clock. The AND operation unit 83 may output the cyclic key vector or the all-zero vector based on the cyclic key vector and the message bit output sequentially in response to a clock. The cumulative sum operation unit 84 may accumulate the operation results in the clocks (for example, the clocks 1 to n) as many as the number of bits of the message to calculate the exclusive OR and may output the calculation result of exclusive OR when the number of clocks is equal to the number of bits of the message (when the clock is n).

Although the invention of the subject application has been described above in conjunction with embodiments and examples, the invention of the subject application is not limited to the foregoing embodiments and examples. The configuration and details of the invention of the subject application are susceptible to various modifications that can be understood by those skilled in the art within the scope of the invention of the subject application.

This application claims the priority based on Japanese Patent Application No. 2012-159505 filed on Jul. 18, 2012, the entire disclosure of which is incorporated herein.

INDUSTRIAL APPLICABILITY

The present invention is suitably applied to a universal hash function computing device that computes a keyed universal hash function. For example, the present invention is applied to such applications as authentication in wireless or wired data communication, database tampering detection, and verification of memory on devices.

REFERENCE SIGNS LIST

10 universal hash function computing device
21 shift register
22 LFSR
23 rotate register
100 input unit
101 message register unit
102 cyclic key register unit
103 AND operation unit
104 cumulative sum operation unit
105 output unit

The invention claimed is:

1. A universal hash function computing device comprising:
   a message register configured to:
      store a message comprised of a number of bits N, N being a prime number and the least primitive root modulo of N being 2, and
      sequentially output the message one bit at a time;
   a cyclic key register configured to:
      store a key, the key having a number of bits equal to N,
      cyclically permutate the key sequentially one bit at a time in a fixed direction, either leftward or rightward, and
      sequentially output a cyclic key vector obtained as a result of the cyclic permutation;
   a memory having stored therein computer program code; and
   a processor configured to access the memory and execute the computer program code to implement:
      an AND operation unit that, based on the cyclic key vector sequentially output from the cyclic key register and a message bit sequentially output from the message register, outputs the cyclic key vector if the message bit is 1 and outputs an all-zero vector having N number of bits if the message bit is 0; and
      a cumulative sum operation unit that accumulates N operation results output by the AND operation unit to calculate an exclusive OR of the N operation results and outputs a calculation result of the exclusive OR when N operation results are accumulated,
   wherein the message register is configured to sequentially output the message one bit at a time in response to a clock,
   wherein the cyclic key register cyclically is configured to cyclically permutate the key sequentially in response to the clock and sequentially output the cyclic key vector obtained as a result of the cyclic permutation in response to the clock,
   wherein the AND operation unit output the cyclic key vector or the all-zero vector, based on the cyclic key vector and the message bit sequentially output in response to the clock, and
   wherein the cumulative sum operation unit accumulates operation results until a number of clock pulses equals N and outputs a calculation result of the exclusive OR when the number of clocks equals N.

2. A universal hash function computing method comprising:
   sequentially outputting, from a message register that stores a message comprised of a number of bits N and in response to a clock, the message one bit at a time, N being a prime number and the least primitive root modulo of N being 2;

cyclically permutating, in response to the clock, a key sequentially one bit at a time in a fixed direction, either leftward or rightward, the key being stored in a cyclic key register and the key having a number of bits equal to N, sequentially outputting, from the cyclic key register and in response to the clock, a cyclic key vector obtained as a result of the permutating;

sequentially outputting, based on the cyclic key vector sequentially output from the cyclic key register and a message bit sequentially output from the message register and in response to the clock, the cyclic key vector if the message bit is 1 and outputting an all-zero vector having N number of bits if the message bit is 0;

accumulating, to calculate an exclusive OR, N operation results of the sequentially outputting based on the cyclic key vector and the message bit until a number of clock pulses equal N; and outputting a calculation result of the exclusive OR when N operation results are accumulated and the number of clock pulses equals N.

3. A non-transitory computer readable medium storing a program which causes a computer to execute a universal hash function method, the universal hash function method comprising:

sequentially outputting, from a message register that stores a message comprised of a number of bits N and in response to a clock, the message one bit at a time, N being a prime number and the least primitive root modulo of N being 2;

cyclically permutating, in response to the clock, a key sequentially one bit at a time in a fixed direction, either leftward or rightward, the key being stored in a cyclic key register and the key having a number of bits equal to N, sequentially outputting, from the cyclic key register and in response to the clock, a cyclic key vector obtained as a result of the permutaing;

sequentially outputting, based on the cyclic key vector sequentially output from the cyclic key register and a message bit sequentially output from the message register and in response to the clock, the cyclic key vector if the message bit is 1 and outputting an all-zero vector having N number of bits if the message bit is 0;

accumulating, to calculate an exclusive OR, N operation results of the sequentially outputting based on the cyclic key vector and the message bit until a number of clock pulses equal N; and outputting a calculation result of the exclusive OR when N operation results are accumulated and the number of clock pulses equals N.

4. A universal hash function computing device comprising:

means for storing a message comprised of a number of bits N and sequentially outputting the message one bit at a time, N being a prime number and the least primitive root modulo of N being 2;

means for storing a key having a number of bits equal to N, cyclically permutating the key sequentially one bit at a time in a fixed direction, either leftward or rightward, and sequentially outputting a cyclic key vector obtained as a result of the cyclic permutation;

a memory having stored therein computer program code; and a processor configured to access the memory and execute the computer program code to implement:
  AND operation means for, based on the cyclic key vector sequentially output from the cyclic key register and a message bit sequentially output from the message register, outputting the cyclic key vector if the message bit is 1 and outputting an all-zero vector having N number of bits if the message bit is 0; and
  cumulative sum operation means for accumulating N operation results output by the AND operation means to calculate an exclusive OR of the N operation results and outputting a calculation result of the exclusive OR when N operation results are accumulated, wherein the means for storing the message sequentially outputs the message one bit at a time in response to a clock, wherein the means for storing the key cyclically permutates the key sequentially in response to the clock and sequentially outputs the cyclic key vector obtained as a result of the cyclic permutation in response to the clock, wherein the AND operation means outputs the cyclic key vector or the all-zero vector, based on the cyclic key vector and the message bit sequentially output in response to the clock, and wherein the cumulative sum operation means accumulates operation results until a number of clock pulses equal N and outputs a calculation results of the exclusive OR when the number of clocks equals N.

* * * * *